3,007,985
SEPARATION OF DIMETHYL BUTANE FROM METHYL PENTANE
Robert C. Binning, Texas City, Tex., assignor, by mesne assignments, to Standard Oil Company, Chicago, Ill., a corporation of Indiana
No Drawing. Filed Feb. 26, 1958, Ser. No. 717,555
11 Claims. (Cl. 260—683.65)

This invention relates to the separation of dimethyl butane from methyl pentane, and it particularly concerns the use of azeotropic distillation for effecting the separation.

The separation of dimethyl butane from methyl pentane by conventional fractional distillation is exceedingly difficult because of the closeness of boiling points of these compounds. For example, 2,3-dimethyl butane (diisopropyl) has a boiling point of 136.4° F. and 2-methyl pentane has a boiling point of 140.5° F. Both dimethyl butanes, i.e. 2,2-dimethyl butane (neohexane) and 2,3-dimethyl butane have excellent antiknock qualities, whereas both of the methyl pentanes, i.e. 2-methyl pentane and 3-methyl pentane are poor by comparison in this respect. 2,3-dimethyl butane has on octane number of 103 F-1 clear; 2,2-dimethyl butane has an octane number of 92 F-1 clear; 2-methyl pentane has on octane number of 73.4 F-1 clear; and 3-methyl pentane has an octane number of 74.5 F-1 clear. Separating either or both of the dimethyl butanes from a portion or all of the methyl pentanes would provide petroleum refiners with a means for improving the antiknock qualities of gasoline. An economical method for effecting such a separation would permit its use with hexane isomerization facilities and reduce costs of the isomerization process.

An object of the present invention is to provide a process for separating dimethyl butane from a mixture thereof with a methyl pentane. Another object is to provide a process for separating a mixture of hexane isomers containing at least one dimethyl butane and at least one methyl pentane into a fraction having a higher octane number and a fraction having a lower octane number, the higher octane fraction being enriched in dimethyl butane. A further object is to provide a process for recovering substantially pure dimethyl butane from a mixture of dimethyl butane with methyl pentane (normal hexane may optionally be present in the mixture). Other objects and advantages of the invention will be more apparent from the detailed description thereof.

In accordance with the present invention a mixture of at least one dimethyl butane and at least one methyl pentane (both isomers of each may be present, and normal hexane may also be present and has no effect upon the process) are introduced into a distillation column. Dichloromethane is also introduced into the column, preferably at about the same height in the column at which the mixture of hexane isomers is introduced. The mixture within the column is azeotropically distilled and an overhead fraction is separated from a bottoms fraction. The overhead fraction contains the dimethyl butane-dichloromethane azeotrope with very little if any methyl pentane, and the bottoms fraction contains the methyl pentane with very little if any dimethyl butane. The overhead fraction can then be processed to recover the dimethyl butane-rich hydrocarbons from the dichloromethane.

As was indicated, the charge mixture which can be processed in accordance with this invention may be a mixture of either 2,3-dimethyl butane and/or 2,2-dimethyl butane with 2-methyl pentane and/or 3-methyl pentane. n-Hexane may be present in the mixture, and when it is it will be concentrated in the bottoms fraction along with the methyl pentane. Hydrocarbon fractions of petroleum origin are the usual charge stock to this invention. The charge stock, due to poor fractionation, may contain minor amounts of higher boiling hydrocarbons such as heptanes and/or lower boiling hydrocarbons such as pentanes (but it is preferred to substantially exclude them by more precise prefractionation). Such compounds may be separated by distillation from the bottoms and/or the dimethyl butanes-rich hydrocarbons recovered from the overhead if desired. Thus a charge stock consisting essentially of $C_6$ paraffins, i.e. isomeric hexanes (minor amounts of pentanes, heptanes, olefins and impurities may be present) is used.

The invention is useful in concentrating or separating the dimethyl butanes present in the hexane fractions of virgin naphtha, reformed naphtha, isomerized light naphthas and the like. Processes which isomerize normal hexanes and methyl pentanes to dimethyl butanes employing noble and non-noble catalysts ordinarily produce a mixture of dimethyl butanes and methyl pentanes (usually also containing normal hexane). The concentration of dimethyl butanes in the product depends to a great extent upon the isomerization temperature due to the chemical equilibria involved. Isomerization processes such as use a platinum or other metal carried upon a support and employ temperatures of from 500 to 800° F. or thereabouts produce a product containing lower concentrations of dimethyl butanes and higher concentrations of methyl pentanes and normal hexane than do isomerization processes using lower temperatures on the order of 250° F. or below such as is used when employing an aluminum-chloride hydrocarbon complex catalyst as in the Isomate Process. The isomerized hexane product from such processes, and particularly from the former process because of its lower octane number, can be charged to the process of this invention to separate it into a fraction enriched in dimethyl butanes and a fraction depleted in dimethyl butanes. The first fraction will have an improved octane number and is an excellent blending stock for gasoline, and the second fraction (which will be rich in methyl pentanes and normal hexane) can be recycled to the isomerization process for conversion to di-methyl butane. Likewise, the once-through product from the Isomate Process can be treated in accordance with this invention, and the methyl pentane-enriched bottoms stream from the azeotropic distillation can be recycled as part of the charge to the Isomate Process. By employing this invention in combination with the Isomate Process, the latter process can be operated using shorter catalyst-hexane contact times and thereby achieve a substantial improvement in the Isomate Process.

It has been discovered that dichloromethane is excellent for effecting the separation desired. Azeotroping with dimethyl butane greatly increases the volatility of the latter hydrocarbon and enables a sharp separation from the methyl pentanes during fractionation. Other agents which azeotrope with dimethyl butane provide no better separation between dimethyl butane and methyl pentane than would be obtained by fractional distillation without such agent. This is the case when using methylal. If methyl formate (which azeotropes with dimethyl butane) is used during the fractional distillation, the separation between dimethyl butane and methyl pentane is even poorer than would be obtained if the methyl formate were not employed during the distillation. The fact that dichloromethane permits selective azeotropic distillation of dimethyl butanes from mixtures containing methyl pentanes is very surprising since other agents of similar boiling point which also azeotrope with both of these compounds do not enhance this separation and in some cases even cause less separation than straight fractionation. Predictability of the effect of an azeotropic agent for the separation involved here does not appear possible.

In carrying out the azeotropic distillation of the charge isomeric hexanes (charge isomeric hexanes is understood to mean one or both of the dimethyl butanes and one or both of the methyl pentanes, with or without normal hexane) with the dichloromethane, the isomeric hexanes and dichloromethane are introduced into a distillation column at some intermediate height therein. The dichloromethane is preferably introduced into the column at about the same height therein as the isomeric hexanes are introduced. The azeotroping agent may be premixed with the isomeric hexanes and then introduced into the column. From 1 to 10, preferably about 2 to 7, e.g. 4, volumes of dichloromethane are introduced into the column per volume of the dimethyl butanes present in the charge mixture of isomeric hexanes introduced into the column. In general, the higher the ratio of dichloromethane to dimethyl butane, the greater is the recovery of dimethyl butane in the overhead. It is obvious that the ratio of dichloromethane to dimethyl butane in the charge mixture may be varied considerably depending upon the amount and concentration of dimethyl butane desired in the overhead. Conventional azeotropic distillation equipment and operating techniques are employed. Distillation columns of 30 or less to 60 or more theoretical plates may be used. By suitable adjustment of the conditions high purity dimethyl butane, i.e. 95% or higher concentration of dimethyl butane, can be made. The reflux ratio may be varied considerably, e.g. from 5:1 or less to 50:1 or more. A reflux ratio of 10:1 is quite satisfactory. As concerns the proportion of the charged dichloromethane and isomeric hexanes which is taken overhead, the larger the amount taken overhead the greater is the recovery of dimethyl butane in the overhead product; but under such circumstances the concentration of dimethyl butane in the hydrocarbons taken overhead is obviously somewhat lower than would be the case if a lower proportion were taken overhead. Usually a balance between the concentration of dimethyl butane in the overhead hydrocarbons and the extent of recovery of dimethyl butane in the overhead is selected in accordance with the desires of the particular operator. Suitable results are obtained by removing as overhead in the distillation that portion of the introduced dichloromethane and isomeric hexanes which equals approximately the sum of the volume of introduced dichloromethane plus about 90% of the volume of dimethyl butane in the charge isomeric hexane mixture. The particular number of theoretical plates, reflux ratio, ratio of dichloromethane to dimethyl butane in the charge, portion of the total charge taken overhead, temperature of the overhead portion, etc. can be varied according to the desires of the particular operator in producing the purity of dimethyl butane desired in the overhead hydrocarbons and the extent of recovery of dimethyl butane desired.

The overhead stream of dichloromethane and dimethyl butane is thereafter processed by any suitable technique to recover the dimethyl butane from the dichloromethane. Because of the amount of dichloromethane employed in the azeotropic distillation will ordinarily be in excess of that amount required to form the dimethyl butane-dichloromethane azeotropic composition, the overhead will contain this excess amount of dichloromethane. A minor amount, the particular amount depending upon the particular distillation conditions employed, of methyl pentane will be present in the dimethyl butane taken overhead. Any suitable technique may be used for recovering the dimethyl butane enriched hydrocarbons from the dichloromethane. The overhead may be washed with water which dissolves small percentages of the dichloromethane without dissolving the hydrocarbons. After all of the dichloromethane has been scrubbed out of the dimethyl butane-rich hydrocarbons, the latter may be used as a gasoline blending component. The aqueous dichloromethane can be distilled, taking overhead an azeotrope of dichloromethane containing 1½% water. This small amount of water can be readily removed by dehydration with dessicants or the like, and the dry dichloromethane recycled to the azeotropic distillation step. Other techniques such as extraction of the dichloromethane from the hydrocarbons in the overhead by use of selective solvents, absorbents or the like may be employed.

Experiments were carried out which are illustrative of the present invention. In this set of experiments, results of which are shown in Table 1, a 50–50 volume mixture of 2,3-dimethyl butane and 2-methyl pentane was charged together with an excess of the azeotroping agent for the dimethyl butane to a 3 ft. Hypercal column operating at a 50:1 reflux ratio. Refluxing was carried out for about 8 hours and then a small sample was removed overhead and analyzed. This technique was followed while employing several azeotroping agents for the dimethyl butane. For comparative purposes, the work was repeated without any added azeotroping agent. The relative separation efficiency, as indicated by the composition of the overhead, for the various experiments is shown in Table 1 which follows:

*Table 1*

| Azeotroping Agent | Composition, Vol. Percent [1] | |
|---|---|---|
| | Charge | Overhead |
| Dichloromethane | 50% 2,3-Dimethyl butane | 96.3% 2,3-Dimethyl butane. |
| | 50% 2-Methyl pentane | 3.7% 2-Methyl pentane. |
| Methyl formate | 50% 2,3-Dimethyl butane | 63.9% 2,3-Dimethyl butane. |
| | 50% 2-Methyl pentane | 36.1% 2-Methyl pentane. |
| Methylal | 50% 2,3-Dimethyl butane | 89.9% 2,3-Dimethyl butane. |
| | 50% 2-Methyl pentane | 10.1% 2-Methyl pentane. |
| None | 50% 2,3-Dimethyl butane | 89.4% 2,3-Dimethyl butane. |
| | 50% 2-Methyl pentane | 10.6% 2-Methyl pentane. |

[1] Composition on an azeotroping agent-free basis.

The use of methylal as the azeotroping agent results in no better a separation than occurs by ordinary fractionation. And straight fractionation produces better results than are obtained by the use of methyl formate as the azeotroping agent. However, excellent separation of the dimethyl butane from the methyl pentane is obtained when using dichloromethane as the azeotroping agent in accordance with this invention.

While the invention has been described with reference to certain specific examples, it is to be understood that it is not limited thereto but includes within its scope such modifications as would be apparent to those skilled in this art.

What is claimed is:

1. A process for separating dimethyl butane from methyl pentane which comprises introducing into a distillation column dichloromethane and a charge mixture consisting essentially of isomeric hexanes which contain at least dimethyl butane and methyl pentane, distilling the mixture of dichloromethane and isomeric hexanes, taking overhead from the distillation column an azeotrope of dichloromethane and dimethyl butane, and removing from the distillation column a methyl pentane-containing bottoms fraction having a lower dimethyl butane concentration than the charge mixture.

2. The process of claim 1 wherein dichloromethane and the charge mixture of isomeric hexanes are introduced into the distillation column at approximately the same height.

3. The process of claim 1 wherein the portion of the introduced dichloromethane and isomeric hexanes which is taken overhead equals approximately the sum of the volume of introduced dichloromethane plus about 90% of the volume of the dimethyl butane in the introduced isomeric hexane mixture.

4. The process of claim 1 wherein high purity dimethyl butane is recovered from the overhead from the distillation column.

5. The process of claim 1 wherein the charge mixture consists essentially of 2,2-dimethyl butane, 2,3-dimethyl butane, 2-methyl pentane, 3-methyl pentane, and n-hexane.

6. The process of claim 1 wherein the charge mixture is obtained from the products of isomerization of a light petroleum fraction.

7. A process for separating at least one dimethyl butane selected from the group consisting of 2,2-dimethyl butane and 2,3-dimethyl butane from an admixture thereof with a methyl pentane composition selected from the group consisting of 2-methyl pentane, 3-methyl pentane, mixtures thereof, and mixtures of at least one of said methyl pentanes with n-hexane, which comprises azeotropically distilling said admixture of isomeric hexanes with dichloromethane, separating an overhead fraction of dichloromethane and isomeric hexanes enriched in dimethyl butane from a methyl pentane-containing bottoms fraction of reduced dimethyl butane concentration, and recovering the isomeric hexanes in the overhead fraction from the dichloromethane.

8. A process for separating a dimethyl butanes-enriched $C_6$ paraffin fraction from a $C_6$ paraffin charge mixture containing dimethyl butanes and methyl pentanes which comprises introducing dichloromethane and the $C_6$ paraffin charge mixture into a distillation column, the dichloromethane being introduced in an amount between about 1 to 8 volumes per volume of dimethly butanes in the introduced $C_6$ paraffin charge mixture, distilling the resultant admixture of dichloromethane and $C_6$ paraffin charge mixture, removing from the distillation column an overhead fraction of dichloromethane and $C_6$ paraffins, the $C_6$ paraffins in the overhead having a greater concentration of dimethyl butanes than is contained in the $C_6$ paraffin charge mixture, the portion of the introduced dichloromethane and $C_6$ paraffins which is taken overhead being approximately equal to the sum of the volume of introduced dichloromethane plus about 90% of the volume of dimethyl butanes in the introduced $C_6$ paraffin charge mixture, removing from the distillation column a bottoms stream of $C_6$ paraffins having a lower concentration of dimethyl butanes than the $C_6$ paraffin charge mixture, and recovering a dimethyl butanes-enriched $C_6$ paraffin fraction from the overhead stream removed from the distillation column.

9. A process of separating 2,3-dimethyl butane from an admixture thereof with methyl pentane which comprises aceotropically distilling said admixture of isomeric hexanes with dichloromethane, separating an overhead fraction of dichloromethane and isomeric hexanes enriched in 2,3-dimethyl butane from a methyl pentane-containing bottoms fraction of reduced 2,3-dimethyl butane concentration, and separating the 2,3-dimethyl butane-enriched isomeric hexanes in the overhead fraction from the dichloromethane.

10. A process for producing dimethyl butane-rich hexanes which comprises isomerizing at least one hexane selected from the group consisting of normal hexane and methyl pentane at a temperature of from 500° to 800° F. using a supported metal catalyst and thereby producing isomerization products containing a major proportion of methyl pentanes and normal hexane and a minor proportion of dimethyl butanes, azeotropically distilling at least a portion of said isomerization products with an agent which forms azeotropes with dimethyl butanes whereby a first fraction containing the azeotroping agent and isomeric hexanes having a higher concentration of dimethyl butanes than is present in the isomerization products is separated from a second fraction of isomeric hexanes which has a lower concentration of dimethyl butanes than is present in said isomerization products, returning at least a portion of said second fraction to the isomerization process, and recovering from said first fraction a dimethyl butane-rich hexane fraction.

11. The process of claim 10 wherein the isomerization is carried out using a supported platinum catalyst.

References Cited in the file of this patent

UNITED STATES PATENTS

| | | |
|---|---|---|
| 2,368,050 | Tooke | Jan. 23, 1945 |
| 2,395,022 | Sutton et al. | Feb. 19, 1946 |
| 2,425,861 | Brown et al. | Aug. 19, 1947 |
| 2,428,815 | Sandberg et al. | Oct. 14, 1947 |
| 2,692,227 | Cines | Oct. 19, 1954 |

OTHER REFERENCES

Horsley: "Azeotropic Data," 1952 (page 23).